Figure 1:
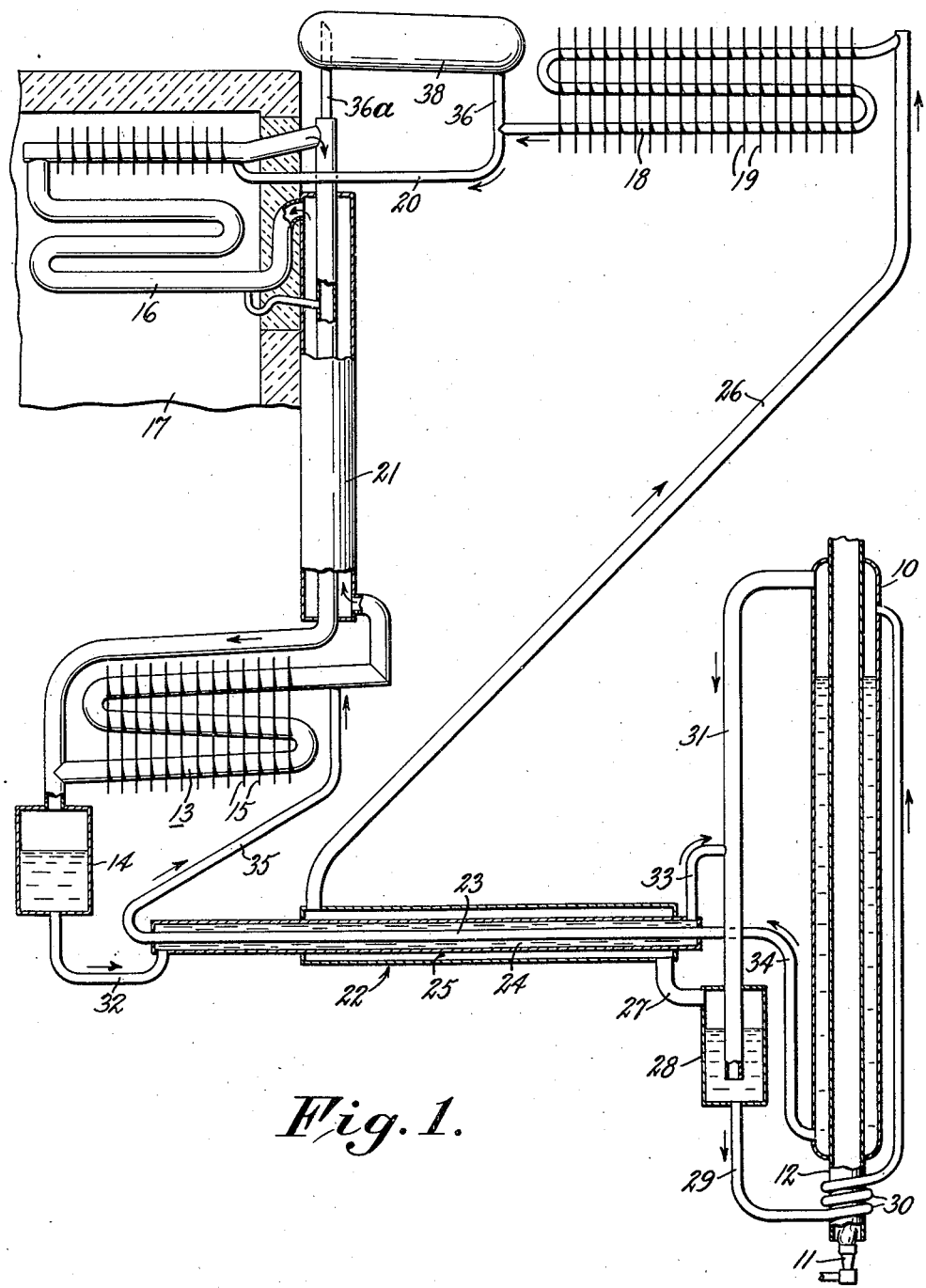

May 21, 1940.   H. K. BERGHOLM   2,201,362
REFRIGERATION
Filed Nov. 20, 1937   2 Sheets-Sheet 1

INVENTOR.
Harry K. Bergholm
BY  D. E. Heath
   his ATTORNEY.

Patented May 21, 1940

2,201,362

UNITED STATES PATENT OFFICE 2,201,362

REFRIGERATION

Harry K. Bergholm, Stockholm, Sweden, assignor, by mesne assignments, to Servel, Inc., New York, N. Y., a corporation of Delaware Application November 20, 1937, Serial No. 175,632
In Germany August 27, 1937

9 Claims. (Cl. 62—119.5)

My invention relates to an absorption type refrigeration system and it is an object of the invention to provide a system of this type having greater efficiency.

Figure 2:
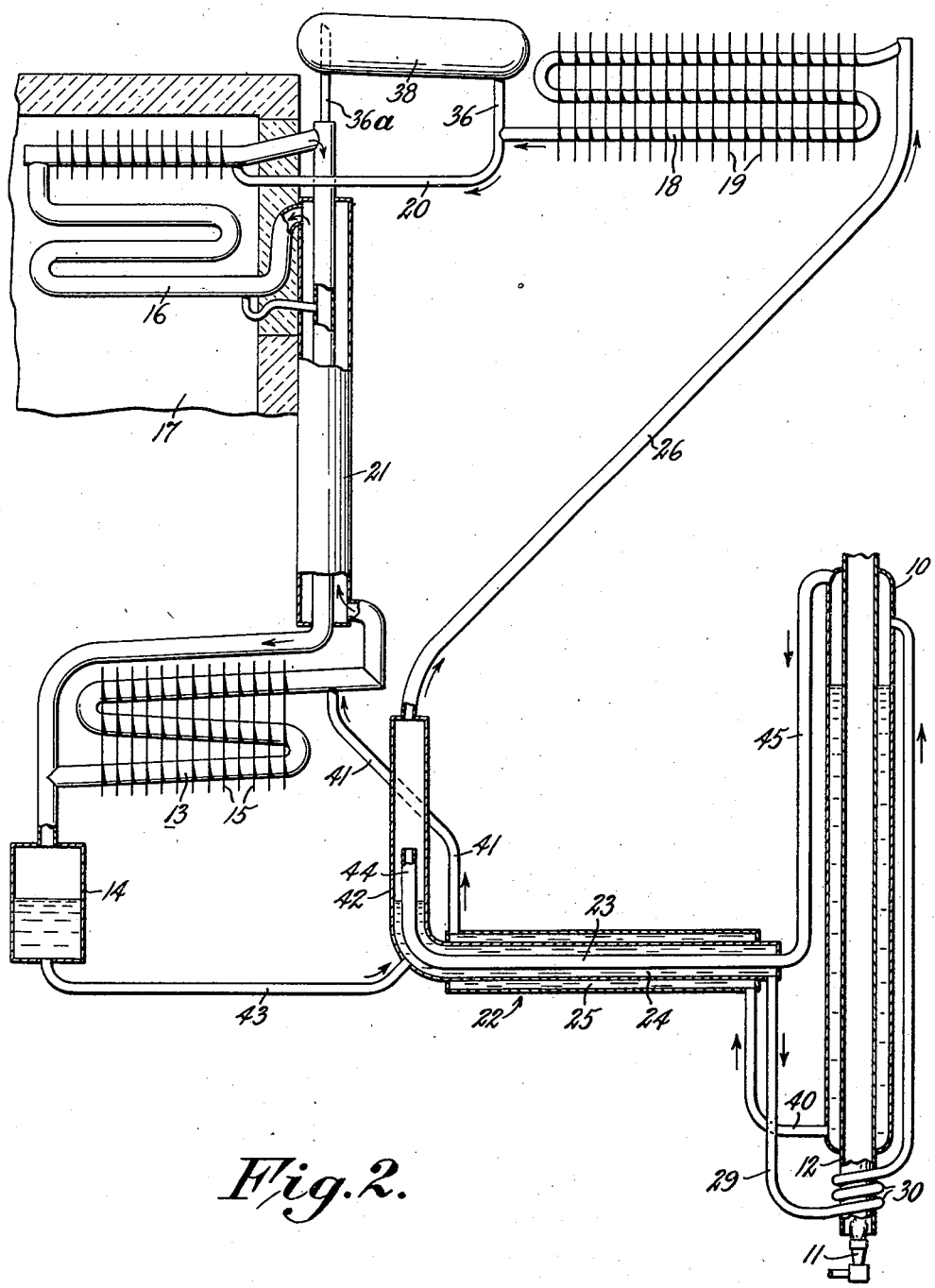

In the drawings:

Fig. 1 shows more or less diagrammatically the invention embodied in an absorption refrigeration system of a type making use of a pressure equalizing fluid; and Fig. 2 shows a modification embodied in a system like that shown in Fig. 1.

Referring to Fig. 1, a generator 10 is heated by a suitable means such as a gas burner 11 arranged so that the burner flame projects into the lower end of a flue 12. An absorber comprises a conduit 13 and a liquid accumulation vessel or sump 14. The lower end of conduit 13 is connected to the upper part of vessel 14. Conduit 13 is provided with heat transfer fins 15 for cooling of the absorber by air. The absorber 13 may be cooled in any other suitable manner, as by a vaporization-condensation circuit or a water circulating coil.

An evaporator comprises a pipe coil 16 located in an insulated refrigerator compartment 17. A condenser comprises a pipe coil 18 provided with heat transfer fins 19 for cooling by air.

The lower part of condenser 18 is connected by a conduit 20 to the upper part of evaporator 16 for flow of condensed liquid refrigerant from the condenser to the evaporator. The evaporator 16 and absorber 13 are interconnected for circulation of inert gas therethrough and therebetween by conduits including a gas heat exchanger 21.

The absorber 13 and generator 10 are interconnected for circulation of absorption liquid therethrough and therebetween by conduits including a triple heat exchanger 22 and vapor flows from the generator 10 to the condenser 18 through conduits which also include the triple heat exchanger 22 as hereinafter described.

The triple heat exchanger 22 comprises an inner passage 23, a middle passage 24 and an outer passage 25. One end of the outer passage 25 is connected by a conduit 26 to the upper end of condenser 18. The other end of the outer passage 25 is connected by a conduit 27 to the upper part of a vessel 28. The lower part of vessel 28 is connected by a conduit 29 to the upper part of generator 10. Conduit 29 has a part formed as a coil 30 around the lower end of the generator heating flue 12. Conduit 29 forms a vapor liquid lift for raising liquid from vessel 28 into generator 10.

The upper end of a conduit 31 is connected to the upper part of generator 10. The lower end of conduit 31 extends into the lower part of vessel 28. One end of the middle passage 24 of the triple heat exchanger 22 is connected by a conduit 32 to the lower part of the absorber vessel 14. The other end of the middle heat exchanger passage is connected by a conduit 33 to conduit 31. The connection of conduit 33 to conduit 31 is made at a level above the bottom of absorber vessel 14 and below the lower end of the absorber conduit 13. The lower part of generator 10 is connected by a conduit 34 to one end of the inner passage 23 of the triple heat exchanger 22. The other end of inner passage 23 is connected by a conduit 35 to the upper part of the absorber coil 13.

The system contains a refrigerant fluid such as ammonia, an absorption liquid for the refrigerant such as water, and inert pressure equalizing gas such as hydrogen. The lower end of condenser 18 is connected by a conduit 36 to the gas circuit. Conduit 36 may be referred to as a vent conduit and includes a vessel 38 which serves as a storage chamber for gas, as known.

In operation, ammonia vapor, expelled by heating from solution in generator 10, flows through conduit 31, vessel 28, conduit 27, the outside passage 25 of the heat exchanger 22, and conduit 26 to the condenser 18. Ammonia vapor is condensed to liquid in condenser 18 and the liquid flows through conduit 20 into the upper end of evaporator 16. Liquid ammonia flows downward in evaporator 16 and evaporates and diffuses into hydrogen which flows upward in evaporator 16, producing a refrigerating effect.

Weakened absorption liquid flows from the lower part of generator 10 through conduit 34, inner passage 23 of the heat exchanger 22, and conduit 35 into the upper part of absorber 13. Absorption liquid flows downward in absorber 13 and absorbs ammonia vapor out of gas from the evaporator which flows upward in the absorber. Enriched absorption liquid flows from the lower end of conduit 13 into the sump 14. Enriched solution flows from the absorber vessel 14 through conduit 32, the middle passage 24 of the heat exchanger 22, conduit 33, and conduit 31 into vessel 28. From vessel 28 rich solution flows through conduit 29 into the generator 10, being raised through conduit 29 in a known manner by the lifting action of vapor formed by heating the solution in coil 30.

The level of liquid in generator 10 is high enough so that the described flow of weak solution from the generator to the absorber is caused by overflow of liquid from the upper end of conduit 35 into the upper part of absorber coil 13. The level of rich solution in the absorber vessel 14 is high enough so that the described flow of rich solution from the absorber to the vessel 28 is caused by overflow of liquid from the upper end of conduit 33 into the descending vapor conduit 31. Conduit 29 is generally U-shaped with the descending leg connected to vessel 28 and the coiled portion 30 formed in the rising leg which is connected to the upper part of the generator. The level of liquid in vessel 28 is high enough so that the column of liquid in this vessel and the descending leg of conduit 29 balances the column of vapor and liquid in the right hand leg of conduit 29 with the rising column extending to the upper end of the rising leg of conduit 29 so that the liquid in this column flows into the upper part of the generator.

There are, thus, three levels of liquid in the system: An upper level in generator 10; an intermediate level in absorber vessel 14; and a lower level in vessel 28.

The lower end of conduit 31 may or may not extend below the level of liquid in vessel 28. If the lower end of conduit 31 is extended below the level of liquid in vessel 28, as shown, vapor from the generator will bubble upward through liquid in vessel 28. In such case vessel 28 may be referred to as an analyzer. The level of liquid in generator 10 will be lowered a distance depending upon the distance of immersion of the lower end of conduit 31 into liquid in the analyzer vessel 28.

In the triple heat exchanger 22, hot weak solution from the generator flows in the inner passage in counter-current to cooler strong solution from the absorber flowing in the middle passage and gives up heat to the latter. Vapors from the generator flowing in the outside passage 25 in counter-current relation to cooler strong solution in the middle passage 24 also give up heat to the latter. The heat transferred from generator vapors to the strong solution in the heat exchanger 22 may be referred to as heat of rectification. The efficiency of the system is increased because this heat comes from the generator and is returned to the generator with the strong solution. The transfer of heat of rectification is accompanied by condensation of water vapor in the outside passage 25 of the heat exchanger. The condensate formed in the outside passage 25 of the heat exchanger drains through conduit 27 into vessel 28 whence it is returned along with strong solution through conduit 29 to the generator, whereby the sensible heat in the condensate is also conserved.

In order to bring the generator vapors into heat exchange relation with solution flowing between the absorber and generator, the vapors are conducted to a level below the surface levels of liquid in the generator and absorber. In order to return to the generator water formed by condensation due to this heat exchange, I have introduced the further surface level of liquid in vessel 28 which is below the level at which condensation takes place so that the condensate may join the rich solution and be raised therewith above the heat exchanger.

In Fig. 2 the system is the same as that described in connection with Fig. 1, and in these figures like parts are indicated by the same reference numerals. In this modification, however, weakened absorption liquid flows from the lower part of generator 10 through a conduit 40, the outside passage 25 of the triple heat exchanger 22, and conduit 41 to the upper end of the absorber 13. The lower end of an upright conduit or standpipe 42 is connected to one end of the middle passage 24 of the heat exchanger. The other end of the middle passage 24 is connected to the descending leg of the vapor liquid lift conduit 29. The upper end of the standpipe 42 is connected to the lower end of conduit 26 which leads to the condenser 18. The lower part of the absorber vessel 14 is connected by a conduit 43 to the lower part of the standpipe 42. Within the standpipe 42 is a conduit 44. The upper end of this conduit is open and located in the upper part of the standpipe 42. The lower end of conduit 44 is connected to one end of the inner passage 23 of the heat exchanger 22. The other end of the inner passage 23 is connected by a conduit 45 to the upper part of generator 10.

Strong solution flows from the absorber through conduit 43, standpipe 42, the middle passage 24 of the heat exchanger 22, and conduit 29 to the generator. The level of liquid in the absorber vessel 14 is below the lower end of the absorber coil 13 but high enough so that the column of liquid in the descending leg of conduit 29 is sufficient to balance the rising column of gas and liquid in the rising leg of conduit 29 to the upper part of the generator. The level of liquid in the standpipe 42 is substantially the same as the level of liquid in the absorber vessel 14. The upper end of conduit 44 is open above this level of liquid in standpipe 42.

Vapors flow from the generator 10 through conduit 45, the inner passage 23 of the heat exchanger 22, conduit 44, the upper part of standpipe 42, and conduit 26 to the condenser 18. In the triple heat exchanger 22, heat is transferred from the weak solution in the outside passage 25 and the vapors in the inner passage 23 flowing counter-current to the cooler rich solution flowing in the middle passage 24. The inner passage 23 of the heat exchanger, and conduit 44 are made small in internal diameter so that water formed by condensation of water vapor in the heat exchanger 22, as previously described, will be swept along by the vapor and caused to flow upward in conduit 44 into the upper part of the standpipe 42. In the upper part of standpipe 42 the condensate is separated from the vapor and descends into the rich solution standing in the lower part of the standpipe 42, so that the condensate is thereby returned into the liquid circuit.

Other changes and modifications may be made within the scope of the invention which is not limited except as indicated in the following claims.

What is claimed is:

1. A method of refrigeration which includes expelling refrigerant from absorption liquid at a place of heating, liquefying the expelled refrigerant, evaporating the liquefied refrigerant, absorbing the evaporated refrigerant into absorption liquid, flowing vapors from said place of heating and liquid to said place of heating in heat transfer relation out of physical contact at a place of heat exchange to cause rectification by condensation of vaporous absorption liquid and conservation of latent heat of rectification by return thereof in the liquid to said place of heating, and utilizing said vapors flowing from the place of heating to cause the condensate to rise above said place of heat exchange in a path of flow returning to said place of heating for conservation of the sensible heat in the condensate.

2. A refrigeration system containing refrigerant and a liquid absorbent for the refrigerant and having a place of heating for causing expulsion of refrigerant from absorption liquid, a place of heat exchange, means to conduct vapors from said place of heating and liquid to said place of heating in heat transfer relation out of physical contact at said place of heat exchange to cause rectification by condensation of vaporous absorption liquid and conservation of the latent heat of rectification by return thereof in the liquid to said place of heating, and means utilizing flow of said vapors from the place of heating to cause the condensate to rise above said place of heat exchange for return to said place of heating to conserve the sensible heat in the condensate.

3. A refrigeration system as set forth in claim 2 which also has means to conduct liquid from said place of heating in thermal exchange relation at said place of heat exchange with liquid flowing to said place of heating.

4. A refrigeration system as set forth in claim 2 which also has means to conduct liquid from said place of heating in heat transfer relation at said place of heat exchange with liquid flowing to said place of heating, and vapor lift means for effecting the flow of liquid.

5. An absorption refrigeration system having a circuit for absorption liquid including a generator, an absorber, and a triple heat exchanger, said exchanger being connected to conduct vapors and liquid from the generator and liquid flowing to the generator in heat transfer relation out of physical contact with each other, means for causing flow of liquid in said circuit, and means utilizing flow of vapor through said heat exchanger for causing condensate formed in the vapor portion of the heat exchanger to be raised for return flow to said generator.

6. Absorption refrigeration apparatus as set forth in claim 5 in which said means for causing flow of liquid in said circuit is a vapor liquid lift.

7. An absorption refrigeration system having a circuit for absorption liquid including a generator, an absorber, and a triple heat exchanger, said exchanger being connected to conduct vapors and liquid from the generator and liquid flowing to the generator in heat transfer relation out of physical contact with each other, said exchanger also being located at a level below the surface levels of liquid in both said generator and said absorber, and means for creating a third surface level of liquid in said circuit below said heat exchanger to permit drainage of condensate from the vapor portion of said heat exchanger into said liquid circuit.

8. An absorption refrigeration system as set forth in claim 7 in which vapors conducted from the generator to the heat exchanger pass in physical contact with absorption liquid flowing from said heat exchanger to said generator.

9. An absorption refrigeration system as set forth in claim 7 in which vapors flowing from said generator to said heat exchanger bubble through absorption liquid below said third surface level.

HARRY K. BERGHOLM.

CERTIFICATE OF CORRECTION.

Patent No. 2,201,362. May 21, 1940.

HARRY K. BERGHOLM.

It is hereby certified that error appears in the above numbered patent requiring correction as follows: In the heading to the printed specification, line 7, for "In Germany August 27, 1937" read --In Germany August 17, 1937--; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents